United States Patent
Zimmermann et al.

(10) Patent No.: US 9,963,078 B1
(45) Date of Patent: May 8, 2018

(54) MODULAR STORAGE/UTILITY RACK FOR JEEP JK INTERIOR

(71) Applicants: Aaron E. Zimmermann, Blue Ridge, TX (US); David M. Lowe, Rockwall, TX (US)

(72) Inventors: Aaron E. Zimmermann, Blue Ridge, TX (US); David M. Lowe, Rockwall, TX (US)

( * ) Notice: Subject to any disclaimer, the term of this patent is extended or adjusted under 35 U.S.C. 154(b) by 5 days.

(21) Appl. No.: 14/756,213

(22) Filed: Aug. 18, 2015

Related U.S. Application Data

(60) Provisional application No. 62/070,235, filed on Aug. 18, 2014.

(51) Int. Cl.
*B60R 7/08* (2006.01)
*B60R 7/14* (2006.01)

(52) U.S. Cl.
CPC . *B60R 7/08* (2013.01); *B60R 7/14* (2013.01)

(58) Field of Classification Search
CPC ... F41A 23/18; B60R 7/08; B60R 7/14; B60R 7/04; B60R 21/026; A47B 81/005
USPC ............ 224/311, 913, 309, 329–331; 211/64
See application file for complete search history.

(56) References Cited

U.S. PATENT DOCUMENTS

| | | | | |
|---|---|---|---|---|
| 595,967 A | * | 12/1897 | Parsons | B60P 3/073 211/175 |
| D371,107 S | * | 6/1996 | Summers | D12/406 |
| 5,611,439 A | * | 3/1997 | Scott | A47B 81/005 211/64 |
| 2004/0079779 A1 | * | 4/2004 | Essig | B60R 9/00 224/550 |
| 2012/0020763 A1 | * | 1/2012 | Kuramoto | B60P 1/5409 414/539 |
| 2015/0102076 A1 | * | 4/2015 | Peck | B60R 9/10 224/309 |

* cited by examiner

*Primary Examiner* — Justin Larson
*Assistant Examiner* — Matthew Theis
(74) *Attorney, Agent, or Firm* — Robert E. Wise

(57) ABSTRACT

A rack for a vehicle comprises a first bracket; a second bracket adapted to removably hang over the rear-most roll bar of a Jeep Wrangler; a longitudinally-extending support bar having a front end and a rear end, the front end attached to the first bracket and the rear end attached to the second bracket; and at least one hanger attached to the support bar and extending downwards, wherein each hanger has two hooks for supporting items to be carried on the hanger.

2 Claims, 5 Drawing Sheets

MODULAR STORAGE/UTILITY RACK FOR JEEP JK INTERIOR

CROSS-REFERENCE TO RELATED APPLICATIONS

The present application claims the benefit of 35 U.S.C. § 111(b) U.S. Provisional Application Ser. No. 62/070,235, filed Aug. 18, 2014, entitled "Utility Rack for Vehicle Interior".

STATEMENT REGARDING FEDERALLY-SPONSORED RESEARCH OR DEVELOPMENT

Not Applicable

THE NAMES OF THE PARTIES TO A JOINT RESEARCH AGREEMENT

Not Applicable.

INCORPORATION-BY-REFERENCE OF MATERIALS ON A COMPACT DISC

Not Applicable.

BACKGROUND OF THE INVENTION

1. Field of the Invention

This invention relates to the art of racks that are mounted within a vehicle, such as a Jeep or an automobile, which racks are capable of holding various items, such as weapons and the like.

2. Description of Related Art

Since 1941 the Jeep 4×4 utility vehicle (later named 'Wrangler') had been available in a two-door model only. In 2007 Jeep introduced a new model of the Wrangler (automotive code name 'JK') which was available in both a two-door and four-door model. Since introduced, the Jeep Wrangler JK has sold more units in a little more than a decade than all previous Jeep Wranglers from 1941 through 2006. The Jeep Wrangler JK has found its way into both daily consumer and full time commercial use.

Given the popularity of the Jeep Wrangler JK, the need to provide secure storage and safely transport differing items has become evident. The items (not all-inclusive) they need to store and transport include: hunters carrying firearms and bows; fishermen carrying fishing poles, fly rods, and can poles; postal workers carrying letters, packages, and other mail-related items; surveyors carrying tripods, measurement sticks, and related equipment; scuba divers carrying spearguns; marksmen carrying precision target firearms; contractors carrying levels and other tools; consumers carrying items for home repair; and the like.

The above list illustrates the wide variety of items needing to be stored and transported by Jeep Wrangler JK owners. While the variety of items is broad, the environment inside and outside the vehicle needs to be considered. Weapons, including rifles, shotguns, and spearguns, must be transported in a safe manner so that the weapons do not unintentionally discharge within the vehicle. Many items are quite expensive and may be easily damaged if incorrectly transported. Some items are delicate and/or calibrated for final use, and need to be transported in a manner that reduces the risk of contact with other items. Passengers inside the vehicle need to have adequate room for movement and safety purposes. Items being transported should not interfere with the driver's view out of vehicle windows, nor interfere with the driver's control of the vehicle. Jeeps are known for their all-purpose use and may be driven over rough unpaved roads or even over terrain where there are no roads; items being transported need to be secured in a way that factors in potential rough driving conditions. Jeeps are also known for the "open" design, making weather a factor when transporting items. A way to protect the items and the vehicle from receiving water and wind damage must be included in the final design.

With the addition of the Jeep Wrangler JK four-door model, passenger entry into the rear seating area has been enhanced. However, interior storage and access is still limited. Place three or four passengers inside and space becomes a premium. Again, the need to provide easy-to-use storage and convenient transport options become apparent.

Racks are known that are mountable within different vehicles, primarily pickup trucks. Many of the known racks extend across the back seating area or the rear window of the vehicle perpendicular to the forward direction of the vehicle. Such racks may be mounted on existing objects (such as a hook) that normally are provided in the vehicle when the vehicle is manufactured. These racks may interfere with passengers who sit in the rear seat of the vehicle, they may limit the driver's vision out of the rear window of the vehicle, and they reduce the ease of access and placement of items in the rack.

Racks are known that were designed for the Jeep Wrangler two-door models. Many of the known Jeep racks were designed for mounting overhead, in the front passenger area, extending between the side roll bar cage running perpendicular to the forward direction of the vehicle. These racks reduce the headroom available to tall drivers and passengers seated in the front seat. They are also a safety concern when removing items, such as firearms, due to pointing the item directly at a passenger. They can only carry an item of limited length.

There is also a rack design known to be mountable within a Jeep Wrangler two-door model running parallel to the forward direction of the vehicle. Such a rack was disclosed in U.S. Design Pat. No. D371,107 to Summers, issued Jun. 25, 1996. The rack disclosed in this design patent is designed to carry only firearms, it requires modification of the Jeep chassis, the fixed position of item "carriers" limits the types of firearms that can be carried, and the rack can only be used when the top of the Jeep is removed. These are obviously serious design limitations.

Generally, known racks mountable within a Jeep Wrangler focus on the two-door model and are designed to only carry firearms. These racks include a frame, a first mounting means for mounting a first end of the frame to a first location in the interior of the Jeep, a second mounting means for mounting a second end of the frame to a second location in the interior of the Jeep, and one or more hook means for holding a firearm wherein the hook means is attached to the frame. There are usually two hook means attached to the frame and each hook means will normally have two hooks extending in opposite directions. Therefore, known racks mountable in the interior of a Jeep will normally carry only two firearms.

It would be desirable to provide a rack for a Jeep Wrangler JK that would carry items other than firearms, carry more than two items, be easy to install and install without modifying the vehicle, and that would attach to existing points in the vehicle. It would be desirable to provide a rack that was easy to adjust once installed, so that different items could be accommodated. It would be desirable to provide a rack that would minimally interfere with passengers inside the vehicle, secure transportation of items in the rack, allow safe removal of items from the rack, minimally interfere with the driver's view out of vehicle windows, and minimally interfere with the driver's control of the vehicle (even while driving on rough terrain). It would be desirable to provide a rack that provides a modular design such that a person using it could decide which components of the rack to install depending on current need. It would be desirable to provide a rack that provides ease of access to items in the rack, standardized and interchangeable parts for multiple configurations, secure installation to remain secure even in rough road conditions, and protect both the carried items and the Jeep interior when the rack is installed.

Finally, it would be desirable for the rack to be capable of installation and use regardless of whether the Jeep's top is on or off, and regardless of whether the Jeep's top is a hard-top or a soft-top.

BRIEF SUMMARY OF THE INVENTION

A new inventive rack for a Jeep Wrangler JK comprises a first Frame, a connector means (Footman Loop Bracket) disposed at a first end of the first Frame for connecting the first end of the first Frame to the existing Jeep's Footman Loop found in all Jeep Wrangler JK models. To the second end of the first Frame is a connector means (Sound Bar Cuff) for connecting the second end of the first Frame to the existing Jeep's Sound Bar found in all Jeep Wrangler JK models. The first end of a second Frame also connects to the Sound Bar Cuff by means of a connector, the T Bracket. The second end of the second Frame connects to the rearmost Jeep roll bar, found in all Jeep Wrangler JK four-door models, via a connector, the Rear Cuff. All three connectors (Footman Loop Bracket, Sound Bar Cuff, and Rear Cuff) utilize standard mounting points (Footman Loop, Sound Bar, Rear Roll Bar) found in all Jeep Wrangler JK four-door models.

The connector means (Footman Loop Bracket) disposed at the first end of the frontmost Frame is a separate piece that is attached to the first end of the frontmost Frame. The Footman Loop Bracket allows the frontmost Frame to be connected to the existing Footman Loop, found in all Jeep Wrangler JK models, without any modification to the vehicle interior. The connector means (Sound Bar Cuff) disposed at the second end of the frontmost Frame is a separate piece that is attached to the second end of the frontmost Frame. The Sound Bar Cuff allows the frontmost Frame to be connected to the existing Sound Bar, found in all Jeep Wrangler JK models, without any modification to the vehicle interior. The connector means (T Bracket) disposed at the first end of the rearmost Frame is a separate piece that is attached to the first end of the rearmost Frame and allows attachment to the Sound Bar Cuff without any modifications to the vehicle interior. The connector means (Rear Cuff) disposed at the second end of the rearmost Frame is a separate piece that is attached to the second end of the rearmost Frame. The Rear Cuff allows the rearmost Frame to be connected to the existing Rear Roll Bar, found in all Jeep Wrangler JK four (4) door models, without any modification to the vehicle interior. The Rear Cuff includes an oval cutout allowing the rearmost vehicle dome light to be fully functional.

The new inventive rack's above six components (Footman Loop Bracket, frontmost Frame, Sound Bar Cuff, T Bracket, rearmost Frame, and Rear Cuff) establish a Frame system running parallel to the forward direction of the vehicle. This Frame system occupies the neutral (unused) space existing between the driver and front passenger in the front passenger compartment area of the Jeep Wrangler JK four-door model. This Frame system continues to the rear passenger compartment and occupies the neutral (unused) area between the two-passengers seated in the rear passenger compartment of the Jeep Wrangler JK four-door model.

The new inventive rack also comprises a variety of standardized hook means (Hangers) for holding different items. Each Hanger is fully adjustable once connected to either the frontmost Frame or rearmost Frame. By connecting two or more of the different Hangers to the Frame system, a person can carry one, two, three, or four different items. A person can also choose to use either the front passenger area, rear passenger area, or both areas for storing and transporting different items.

The new inventive rack utilizes standardized Frame design for both the frontmost Frame and rearmost Frame. This standardized Frame design allows for easy adjustment once installed and a variety of Hanger combinations for carrying different items.

The Frame of the vehicle rack can be made of any suitable material (for example, aluminum, stainless steel, or preferably powder coated steel). The Frame is formed generally as a channel iron or channel bar. However, since one or more Hangers will be attached to the Frame, it is desirable that it be formed as a three-sided square or rectangular channel shape with one open side. The side of the Frame which comprises slots for the Hangers will preferably be a flat side rather than curved, since it will be easier to bolt on the Hangers if the side with the slots is relatively flat. Elongated slots are formed in the middle side, extending in the longitudinal direction of the Frame, so that the Hangers can be attached to the Frame at multiple suitable locations of the user's choice and offer full adjustability. The elongated slots have a width that is sized to fit the bolts that are intended to be used to connect the Hangers which will support the different items in the rack.

A new inventive mounting means for mounting an end of either the frontmost or rearmost Frame to an object disposed within the interior of a vehicle comprises a 'unitary' sheet of metal. The word "unitary" as used herein for the unitary sheet of metal means a single sheet of metal that was not formed from multiple individual sheets. The unitary sheet of metal will generally be formed from a flat or flattened sheet of metal that is cut into the desired shape, has the required holes punched or drilled through it, and bent via a stamping process into the desired shape. The unitary sheet of metal will then have the shape described in this application and shown in the figures. The particular shape of this unitary sheet of metal allows for ease of installation and use within the vehicle without any modifications to the interior of the vehicle.

The unitary sheet of metal can be made from any suitable metal or alloy of metals. Example of metals that can be used would include aluminum, steel, and stainless steel. The metal can be anodized or otherwise powder coated, if desired. The gauge of the unitary sheet of metal should be sufficiently thick, given the particular metal used, so that the unitary sheet of metal is strong enough to hold onto the object within the interior of the vehicle and strong enough so that the bolted connection between the unitary sheet of metal and the rack Frame will not come apart during normal use and with the anticipated loads that the Frame is designed to carry. The unitary sheet of metal can be sized to any suitable size that is sufficiently strong and easy to mount, but which is not so large as to be cumbersome or unnecessarily expensive.

It will be apparent to persons of ordinary skill in this art that the unitary sheet of metal described above could also be formed as a multi-part device with multiple parts connected such that the device is functionally equivalent to the unitary sheet of metal described. For example, one could take four separate generally flat sheets of metal and connect them together (by welding, soldering, bolting with the use of brackets, or another suitable manner) such that the result is functionally equivalent to the unitary sheet of metal described.

The new inventive rack has three components utilizing the new inventive mounting means created with the unitary sheet of metal procedure. The Footman Loop Bracket, Sound Bar Cuff and Rear Cuff are all formed in order to connect to the existing interior points of the Jeep Wrangler JK four-door model without requiring any modifications to the vehicle interior.

DETAILED DESCRIPTION OF THE INVENTION

Figure 1:
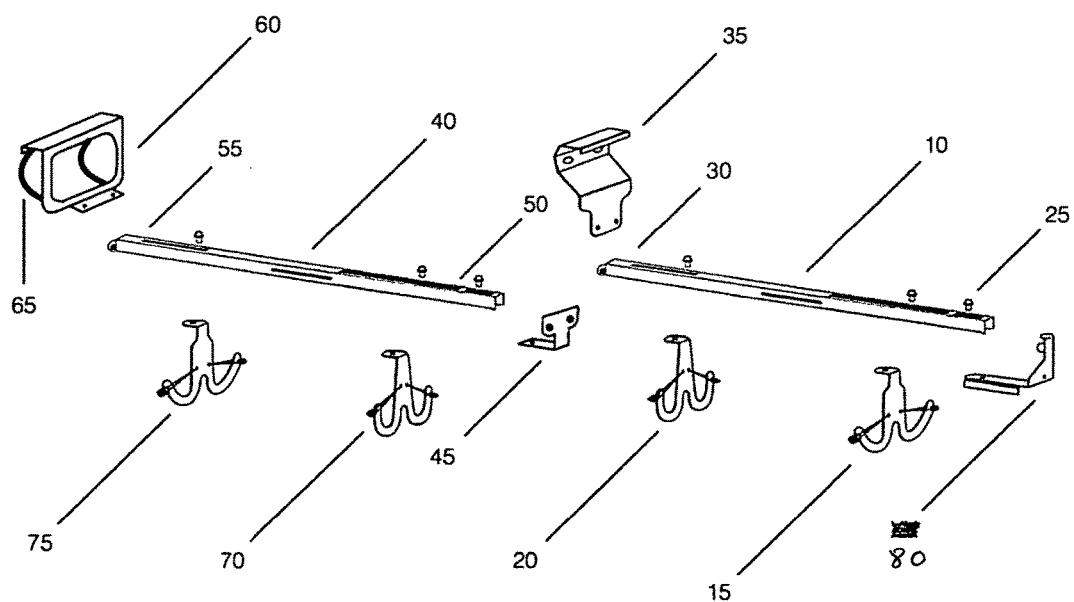
FIG. 1 shows an exploded view of the various parts of a preferred embodiment of this invention.

Referring now to FIG. 1, there is shown an exploded view of the novel vehicle rack and how it is arranged prior to installation. FIG. 1 is referred to as the 'TPRJK Deluxe' version as it is designed to carry up to four different items.

The front frame 10 is an elongated channel iron or channel rod. In cross-section, it will have three sides and will be open on the bottom side. There will be longitudinally extending slots in the top side. Hangers 15 and 20 are shown suspended from the front frame 10. Each hanger is bolted onto the front frame 10 with a bolt that extends through one of the top side slots in the front frame top section and into a PEM nut found on each hanger. Because the front frame 10 has extended slots in the top side, both hangers 15 and 20 can be mounted at almost any location along the length of the front frame 10, thereby providing the user with substantial adjustability depending on the desired use.

The hangers 15 and 20 are capable of securely holding and carrying at least one item within the Jeep while it is traveling. The item to be carried will normally be oriented in the same longitudinal direction as the front frame 10 when it is disposed on the hanger devices 15 and 20.

The front frame 10 is attached to the Footman Loop within the Jeep at the front end 25 of the front frame 10 by means of a footman loop bracket 80. The front end 25 of the front frame 10 is disposed toward the forward direction of travel of the Jeep in relation to the other parts of this invention.

The front frame 10 has a rear end 30 longitudinally opposite from the front end 25. This rear end 30 will be supported in the interior of the Jeep by a known means of attachment, the sound bar cuff 35. The sound bar cuff 35 will be hung from the center of the "B" pillar cross beam (called the "Sound Bar") which extends from side to side across the middle of the top of the interior of the Jeep. The Sound Bar is a plastic housing, found in all Jeep Wrangler JK models, and covers the middle roll bar and houses two speakers and a dome light. The rear end 30 of the front frame 10 is bolted onto the bottom portion of the sound bar cuff 35 with two threaded bolt and PEM nut combinations.

Therefore, the front frame 10 is suspended from and attached to elements of the interior of the Jeep at both longitudinal ends of the front frame 10. The front frame 10 is mounted across the front passenger section of the Jeep between the driver's seat and the front passenger's seat. The front frame 10 does not extend significantly rearward of the backrests of the driver's seat and the front passenger's seat.

A rear frame 40 is an elongated channel iron or channel rod. In cross-section, it will have three sides and will be open on the bottom side. There will be longitudinally extending slots in the top side.

A connector means, T-bracket 45, is disposed at a front end 50 of the rear frame 40 for connecting the front end 50 of the rear frame 40 to the sound bar cuff 35. The vehicle rack further comprises a mounting bracket, rear cuff 60, disposed at the rear end 55 of the rear frame 40. The rear cuff 60 is provided to securely mount the rear end 55 of the rear frame 40 to the center of the rearmost roll bar of the vehicle which extends across the "C" pillars of the vehicle. Two closable loops of Velcro® strap 65, or anything else having a similar function, can be used to anchor the rear cuff 60 to the "C" pillar roll bar. Two hangers 70 and 75 can be attached to and suspended from the rear frame 40 in the same manner as described for hangers 15 and 20 above. A variety of items can be placed on and secured to hangers 70 and 75. While there are two hangers shown in the drawings, it is possible to one or three or any other number of hangers depending on what the user needs in a particular situation.

The connector means, T-bracket 45, is designed to be bolted to the top side of the front end 50 of the rear frame 40, through one of the elongated slots in the rear frame 40. The T-bracket 45 also has a face with two holes. The T-bracket 45 can be attached to the sound bar cuff 35 by inserting threaded bolts through the holes in both the face of the T-bracket 45 and sound bar cuff 35 and securing it to the PEM nuts located in the front frame 10.

The rear cuff 60 is designed and shaped to fit the contour of the rear-most roll bar of the Jeep Wrangler JK four-door model, as it has been produced since the model year 2007 onwards. At the center of the rearmost roll bar of the Jeep, there is a dome light which is used to light at least a portion of the interior of the automobile. The rear cuff 60 is designed and shaped to fit around that dome light, so that it does not interfere with its purpose. The rear cuff 60 is also designed and shaped to be quickly fitted into place by hand with minimal effort. Once placed on the roll bar, the rear cuff 60 will be secured to the roll bar by looping two Velcro® straps 65 through a first slot on one end of the rear cuff 60, running the Velcro® straps 65 around the outside of the roll bar opposite to the rear cuff 60, and then running the Velcro® straps 65 through a second slot on the opposite end of the rear cuff 60, and then placing the hook portion of the Velcro® straps 65 against the loop-portion of the Velcro® straps 65, causing it to attach together. The two Velcro® straps 65 anchor the rear cuff 60 to the roll bar such that it will stay in place during normal use. It is preferable to use two Velcro® straps separated somewhat on the mounting bracket, but other numbers and arrangements of straps may function adequately.

Figure 2:
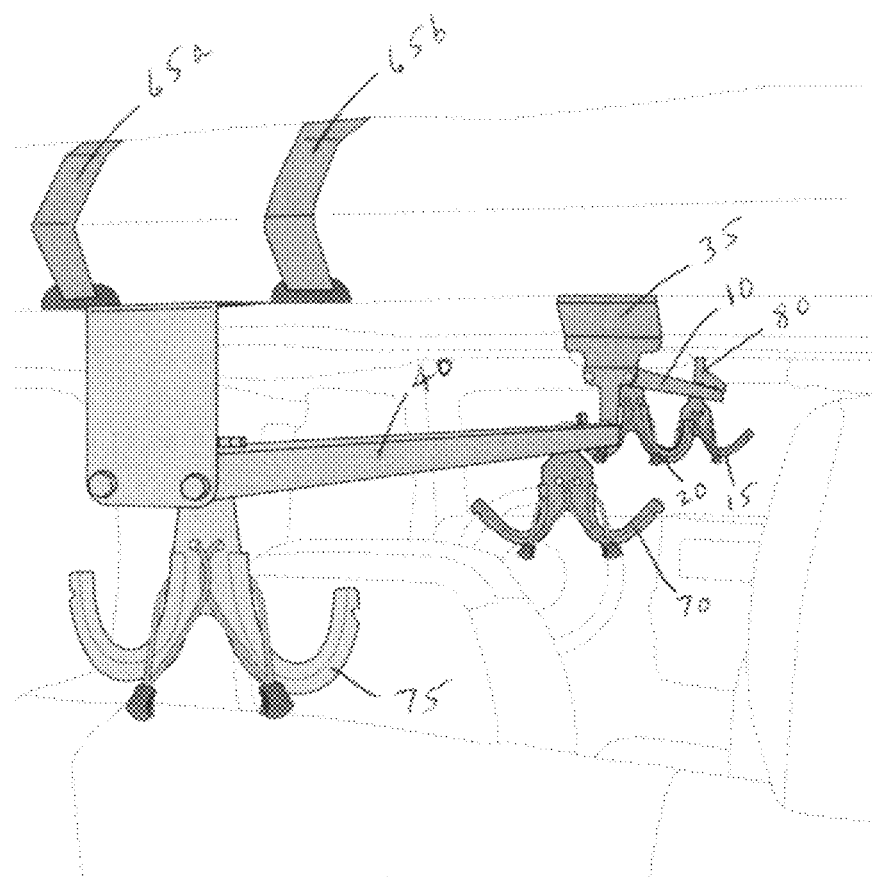
FIG. 2 shows the preferred embodiment assembled and installed in a Jeep vehicle.

FIG. 2 illustrates the TPRJK Deluxe version of the novel vehicle rack assembled and installed in a Jeep Wrangler JK four-door. The view is from the rear luggage compartment looking forward toward the front of the Jeep interior. In this figure, the two Velcro® straps 65a and 65b are shown wrapped around the rear-most roll bar of the Jeep Wrangler, and are securing the rear cuff 60 to that roll bar. The front end 50 of the rear frame 40 is shown attached to the T-bracket 45 which is itself attached to the sound bar cuff 35. The rear end 55 of the rear frame 40 is attached to the rear cuff 60. Hangers 70 and 75 are shown attached to the rear frame 40 such that a weapon can be laid upon the hooks of the hangers in a known manner and secured by means of the elastic straps attached to hear hanger. All attachments can be accomplished with hex bolts secured with either standard nuts or PEM nuts and mounted through pre-drilled holes or slots in the various elements.

It will be apparent to anyone familiar with the Jeep Wrangler automobiles that the novel rack shown in this preferred embodiment can be mounted, used, and removed from the Jeep regardless of whether the vehicle has a hard-top or a soft-top, or whether the top is on or off of the vehicle. This provides a useful capability that was not even comprehended in the prior art.

Figure 3:
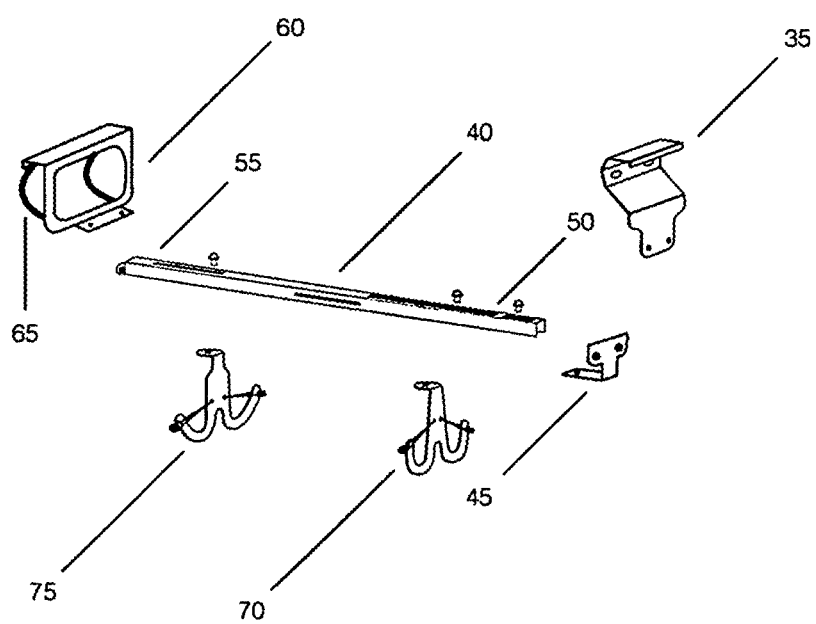
FIG. 3 shows an exploded view of a part of the preferred embodiment of this invention.

Referring now to FIG. 3, there is shown an exploded view of the novel vehicle rack and how it is arranged prior to installation. FIG. 3 is referred to as the 'TPRJK Rear' version as it is designed to carry two different items. The TPRJK Rear version can be used when the user needs to carry one or two items and it is preferred to have the items located in the rear passenger compartment. The TPRJK Rear version illustrates the modular design of the novel vehicle rack and how a user can choose the required components.

The version shown in FIG. 3 is the same as that shown in FIG. 1 except that the front frame 10, hangers 15 and 20, and footman loop bracket 80 can all be omitted. This version is assembled and mounted in the Jeep in the same manner described above with reference to FIGS. 1 and 2.

Figure 4:
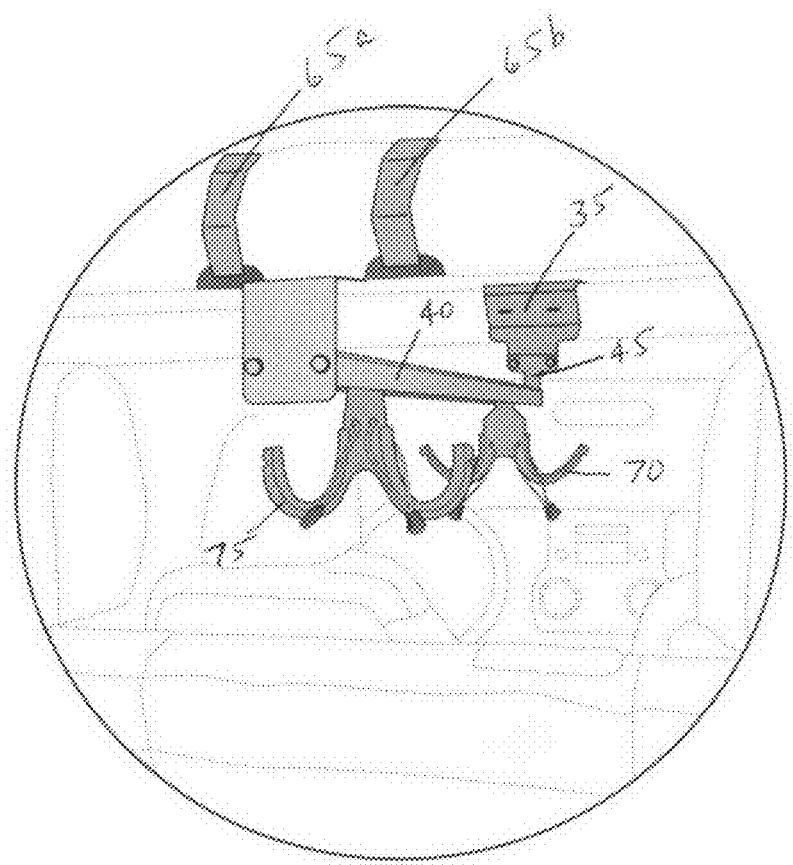
FIG. 4 shows a part of the preferred embodiment assembled and installed in a Jeep vehicle.

FIG. 4 illustrates the TPRJK Rear version of the novel vehicle rack assembled and installed in a Jeep Wrangler JK four-door. The view is from the rear luggage compartment looking forward to the front of the Jeep interior. As seen in the figure, the front end 50 of rear frame 40 is attached to T-bracket 45. T-bracket 45 is attached to sound bar cuff 35 which is itself mounted on the sound bar or "B" pillar cross beam. The rear end 55 of rear frame 40 is attached to the rear cuff 60. Rear cuff 60 is mounted around the rear-most roll bar and secured thereto with Velcro® straps 65a and 65b. Hangers 70 and 75 are mounted at two different locations along the length of the rear frame 40. As is apparent from FIG. 4, the rear frame 40 can be mounted inside the Jeep independently of the front frame 10 or with it.

Figure 5:
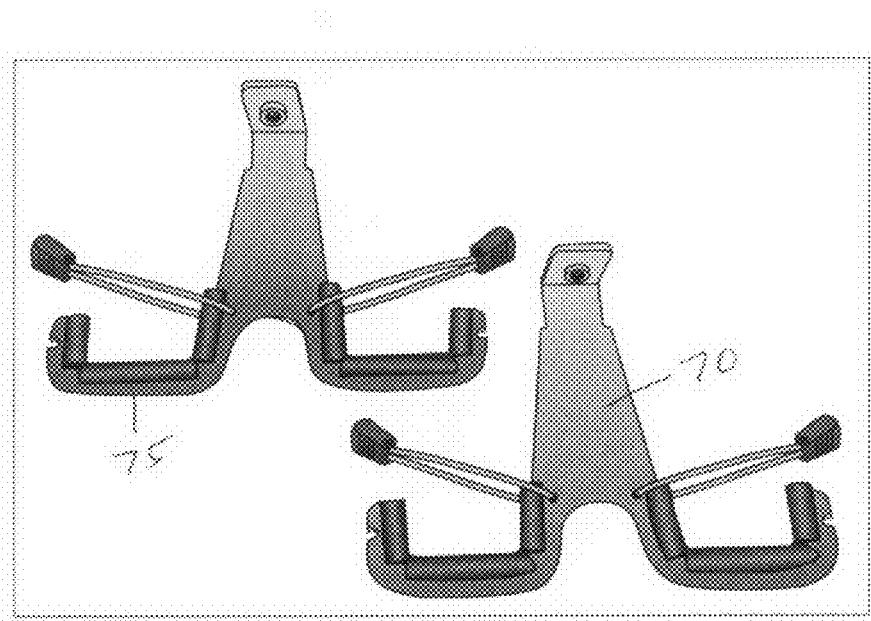
FIG. 5 shows a close-up detail of two hangars usable with the preferred embodiment.

FIG. 5 shows universal hangers 70 and 75 that can be used with either the TPRJK Deluxe or TPRJK Rear modular storage/utility racks. Each hanger has two elasticized straps (each with a holding tab) that can be used to cover and close the two individual hooks on each hanger, thereby better securing a carried item when the Jeep bounces on rough roads. The notch on the outer part of each hook of a hanger helps the elasticized strap stay in place when the strap is placed into the notch. This is highly desirable because a gun might accidently discharge if it was to fall off of even one hook of one hanger.

The preceding description of the preferred embodiment is only an example of this invention. After reading this disclosure, persons of ordinary skill in this art will be able to conceive other examples and embodiments that come within the scope of this invention. This invention is not limited to the preferred embodiment disclosed above. It is meant to be limited only by the following claims.

We claim:
1. A rack for a vehicle comprising:
   a) a passenger vehicle having a front end, a back end, a first side extending generally from the front end to the back end, and a second side extending generally from the front end to the back end, the vehicle further comprising a first cross-beam, and a second cross-beam, both cross-beams disposed generally between the first side and the second side of the vehicle, and wherein the second cross-beam is disposed more near the back end of the vehicle than is the first cross-beam;
   a) a first longitudinally-extending support bar having a first end and a second end;
   b) a first clamp attached to the second end of the first longitudinally-extending support bar, the first clamp being also attached to the vehicle's second cross-beam;
   c) a second clamp attached to the vehicle's first cross-beam wherein the second clamp comprises a segment that extends downwardly from the vehicle's first cross-beam by a predetermined distance;
   d) an angled bracket having two segments disposed at an angle to one another, wherein the first segment of the angled bracket is removably attached to the downwardly extending segment of the second clamp and wherein the second segment of the angled bracket is removably connected to the first end of the first longitudinally-extending support bar;
   e) the passenger vehicle further comprising a third cross-beam, the third cross-beam being extending generally between the first side and the second side of the vehicle and the third cross-beam being disposed nearer the front of the vehicle than either the first or second cross-beams;
   f) a second longitudinally-extending support bar having a first end and a second end; and
   g) the first end of the second longitudinally-extending support bar being connected to the vehicle's third cross-beam, and the second end of the second longitudinally-extending support bar being connected to the downwardly extending segment of the second clamp.

2. The rack of claim 1 further comprising at least one hanger attached to the second longitudinally-extending support bar, wherein the hanger extends downwards and has two hooks for supporting items to be carried by the first support bar.

* * * * *